(12) United States Patent
Clothier et al.

(10) Patent No.: US 7,443,125 B2
(45) Date of Patent: Oct. 28, 2008

(54) POWER CONVERSION APPARATUS

(75) Inventors: Andrew Charlton Clothier, Wiltshire (GB); Stephen Greetham, South Gloucestersdhire (GB); Mark Henry Haywood, South Gloucestersdhire (GB); Nigel James Leighton, Wiltshire (GB); Neil William Phillips, Avon (GB)

(73) Assignee: Dyson Technology Limited, Wiltshire (GB)

( * ) Notice: Subject to any disclaimer, the term of this patent is extended or adjusted under 35 U.S.C. 154(b) by 0 days.

(21) Appl. No.: 10/538,508

(22) PCT Filed: Dec. 10, 2003

(86) PCT No.: PCT/GB03/05384

§ 371 (c)(1),
(2), (4) Date: Jan. 6, 2006

(87) PCT Pub. No.: WO2004/057747

PCT Pub. Date: Jul. 8, 2004

(65) Prior Publication Data
US 2006/0132081 A1   Jun. 22, 2006

(30) Foreign Application Priority Data
Dec. 21, 2002   (GB)   ................................ 0229873.5

(51) Int. Cl.
*H02P 25/08* (2006.01)
(52) U.S. Cl. ........................................ 318/701; 363/34
(58) Field of Classification Search ................ 318/254, 318/701, 293, 400.29; 15/300.1, 246, 246.2; 363/34, 37
See application file for complete search history.

(56) References Cited

U.S. PATENT DOCUMENTS 4,223,258 A * 9/1980 Lacy ........................... 318/599

(Continued)

FOREIGN PATENT DOCUMENTS

DE    2835301 A    8/1979

(Continued)

OTHER PUBLICATIONS

Sedra/Smith; "Microelectronic Circuits", Fourth Edition, Oxford University Press, Oxford, 1998. Section 3.7, pp. 179-191 show Rectifier Circuits.*

(Continued)

*Primary Examiner*—Bentsu Ro
(74) *Attorney, Agent, or Firm*—Morrison & Foerster LLP

(57) ABSTRACT

A power conversion apparatus for converting power from an alternating source to dc includes an input stage for receiving power from the alternating source, which includes an input filter, a rectifier for rectifying the alternating signal, a capacitor for storing energy from the rectified signal, and an output for outputting power from the rectifying means and the capacitor to the pulsed load. The pulsed load has at least one switched winding which receives power from the output, and wherein the capacitor is configured such that the voltage across the capacitor falls below 15% of the nominal peak rectified voltage of the source during each cycle of the alternating source. A converter of this kind provides benefits in that the current drawn from the ac supply falls within limits imposed by regulations and is simpler and cheaper than known converters of a similar power rating.

11 Claims, 23 Drawing Sheets

STATE 1: TR2 + TR3 ON

U.S. PATENT DOCUMENTS

| | | | |
|---|---|---|---|
| 4,236,102 A * | 11/1980 | Warmbier et al. | 388/819 |
| 4,329,630 A * | 5/1982 | Park | 318/258 |
| 4,494,055 A * | 1/1985 | Bitting et al. | 318/254 |
| 4,540,920 A * | 9/1985 | Cutler et al. | 318/7 |
| 4,567,411 A * | 1/1986 | Reimann et al. | 388/811 |
| 5,058,710 A * | 10/1991 | Iwasa | 187/290 |
| 5,224,029 A | 6/1993 | Newman, Jr. | |
| 5,272,428 A * | 12/1993 | Spiegel et al. | 318/803 |
| 5,353,213 A | 10/1994 | Paulik et al. | |
| 5,404,082 A | 4/1995 | Hernandez et al. | |
| 5,471,125 A * | 11/1995 | Wu | 318/803 |
| 5,513,058 A | 4/1996 | Hollenbeck | |
| 5,606,232 A | 2/1997 | Harlan et al. | |
| 5,705,904 A * | 1/1998 | Kuriyama | 318/439 |
| 5,764,019 A * | 6/1998 | Webster | 318/701 |
| 5,850,133 A * | 12/1998 | Heglund | 318/700 |
| 5,973,936 A | 10/1999 | Lenz et al. | |
| 6,201,368 B1 * | 3/2001 | Webster | 318/729 |
| 6,486,644 B1 | 11/2002 | Nemirow | |
| 6,490,752 B2 * | 12/2002 | Kushida et al. | 15/319 |
| 6,603,672 B1 * | 8/2003 | Deng et al. | 363/37 |
| 6,801,441 B2 * | 10/2004 | Salama | 363/37 |
| 6,879,062 B2 * | 4/2005 | Oates | 307/140 |
| 6,958,589 B2 * | 10/2005 | Kawaji et al. | 318/802 |
| 7,035,123 B2 * | 4/2006 | Schreiber et al. | 363/37 |

FOREIGN PATENT DOCUMENTS

| | | |
|---|---|---|
| GB | 2349517 A | 11/2000 |
| WO | WO-01/28083 A | 4/2001 |
| WO | WO-01/47094 A2 | 6/2001 |

OTHER PUBLICATIONS http://www.kpsec.freeuk.com/powersup.htm. This website shows "Power Supplies". Page 6 shows a formula for calculating smoothing capacitor for 10% ripple. This technology is known at least prior to 1970.* http://hyperphysics.phy-astr.gsu.edu/hbase/electronic/rectct.html. This website shows a center-tap full-wave rectifier. Page 4 shows a calculator to calculate the ripple for RC filter. This technology is known at least prior to 1970.*

Geun-Hie Rim et al. "A Novel Converter Topology for Switched Reluctance Motor Drives Improving Efficiency and Simplifying Control Strategy," 25th Annual IEEE, Jun. 20-25, 1994, pp. 937-942.

S. Chan et al. (1993) "Performance Enhancement of Single-Phase Switched-Reluctance Motor by DC Link Voltage Boosting," IEE Proceedings B. Electrical Power Applications, Institution of Electrical Engineers 140(5), pp. 316-322.

International Search Report issued in counterpart PCT/GB03/05384.

GB Search Report in counterpart GB application 0229873.5.

* cited by examiner

POWER CONVERSION APPARATUS

FIELD OF THE INVENTION

This invention relates to power conversion apparatus for use with, or as part of, electrical apparatus which employs a pulsed current load. The invention is particularly applicable to, but not limited to, motors and power supplies.

BACKGROUND OF THE INVENTION

A large number of power electronics applications now require the generation of an intermediate dc voltage stage. Taking the example of a variable speed motor, shown in FIG. 1, the motor will derive a power supply from a standard ac mains supply 10 at the local voltage and frequency. The mains supply is fed to a mains filter 15, which serves to protect the equipment from any spurious signals on the supply as well as to prevent unwanted signals generated by the equipment from being propagated over the supply. The 'cleaned' supply is then converted to dc by a dc link stage 20. The conversion to dc includes a bridge rectifier D1-D4 and some form of circuitry to produce a more even, dc-like, output from the rectified signal, such as a capacitor. In this example, the dc link stage includes a boost Active Power Factor Correction stage (boost APFC stage) 25 which will be described more fully below.

Another example of the use of an intermediate dc stage is in ac-to-dc-to-dc converters which are used for dc power supplies. In these types of power supply a mains ac supply is first converted to dc before being converted to dc at the required voltage.

Typically, passive forms of power conversion which include an intermediate dc stage have a disadvantage in that they distort the shape of the voltage and current waveforms drawn from the mains supply. Electromagnetic Compatibility Standards (EMC), such as those set out in British Standard EN 61000-3-2 (1995) and in the EMC Directive (89/336/EEC), define an acceptable level for the harmonic content in the current which electrical equipment draws from a mains ac supply, as well as an acceptable level of voltage distortion. These standards place constraints on how power conversion can be carried out. In addition, the power factor is of concern since this will determine the rating of components such as the mains cable and whether the local mains supply system will be adequate.

The way in which the dc link is implemented varies according to the required output power of the system. For a low power load, a dc output can be achieved very simply by placing a capacitor Cdc across the output of the bridge rectifier, in parallel with the load. In order to maintain a highly regulated dc voltage, the dc side capacitor Cdc must have a high capacity. The large capacitor Cdc causes the input current to have a low power factor, and current is only drawn from the mains supply when the magnitude of the mains input voltage (Vac) is greater than the dc voltage (Vdc). The input current resembles a series of spaced-apart peaks, which causes a significant low frequency harmonic content. It is this harmonic content that limits this approach to low power systems only, since for higher power loads the harmonic content would breach the levels defined by the EMC regulations or lead to an unacceptably low power factor.

Various techniques have been developed to improve the quality of the input current. Additional components can be added to the input filter stage, or the well known 'valley fill' circuit can be used. The valley fill circuit improves the input current shape by splitting the dc link capacitor into two. For the standard bridge rectifier, current is drawn from the mains supply when the magnitude of the mains input voltage (Vac) is greater than the dc voltage (Vdc). However, for the valley fill circuit, current is drawn when the magnitude of the mains supply is greater than half of the dc voltage (Vdc/2). This means that current is taken from the mains for a longer period than that of the standard bridge rectifier, resulting in an improved power factor.

Due to the harmonic limitations of the above schemes, actively controlled input rectifiers are often used. The most common of these is the boost APFC stage shown in FIG. 1.

Two control loops—a voltage control loop and a current control loop—define the switching action of power transistor TR1. The voltage control loop maintains the dc link voltage (Vdc) at the required level, and this is achieved by adjusting the amplitude of the current control loop's current reference. The current control loop ensures the input current follows the reference defined by the voltage control loop. This multi-loop control structure dictates that one loop must be dominant. The general convention is that the current control loop dominates. This has the effect that dc voltage regulation (particularly during transient events) is limited, due to the limited performance of the slave loop. Generally, increasing the value of the dc link capacitance (Cdc) compensates for this limitation.

FIGS. 2 and 3 show both the start-up transient and the steady state performance of the converter. Initially (0<t<0.005 seconds), the converter is uncontrolled (the action of the boost stage is irrelevant if Vdc<|Vac|). Once the condition Vdc>|Vac| is achieved, the boost APFC stage actively controls the input current to be substantially sinusoidal, with very good power factor. The high frequency superimposed on the main 50 Hz component is due to the switching action of the boost converter and is directly related to the switching frequency of TR1. The selected switching frequency for the converter must be sufficiently greater than the harmonic limits imposed by the EMC standards.

SUMMARY OF THE INVENTION

The present invention seeks to provide an improved method of power conversion and an improved type of power converter.

Accordingly, the present invention provides a power converter that includes an input stage for receiving power from the alternating source, which includes an input filter, a rectifier for rectifying the alternating signal, a capacitor for storing energy from the rectified signal, and an output for outputting power from the rectifying means and the capacitor to the pulsed load. The pulsed load has at least one switched winding which receives power from the output, and wherein the capacitor is configured such that the voltage across the capacitor falls below 15% of the nominal peak rectified voltage of the source during each cycle of the alternating source. A converter of this kind provides benefits in that the current drawn from the ac supply falls within limits imposed by regulations and is simpler and cheaper than known converters of a similar power rating.

A converter of this kind has an advantage in that the current drawn from an ac supply can fall within limits imposed by EMC regulations, with a simpler and cheaper apparatus in comparison to known converters of a similar power rating. For example, the link capacitor can be constructed as a film-type capacitor which is capable of coping with the required ripple current and is cost-effective. The converter meets EMC regulations because the dominant frequency of the supply current, i.e. the frequency with the greatest amplitude, is equal to the frequency of the ac voltage supply and the majority of the harmonic content is at the switching frequency of the pulsed current load and harmonics of that switching frequency. For a load which operates at a high switching frequency, such as a high speed motor or a switched mode power supply, the harmonic content will be located outside the frequency bands set out in the EMC standards.

Because the capacitor forming part of the dc link stage of the converter has a small value, this has the advantages of reducing cost and physical space occupied by the converter. It is preferable that the size (capacity) of the capacitor in the dc link stage is matched to the amount of energy that is transferred from inductive elements in the input filter and the load. Thus, when the load is in the form of a motor, when one of the motor windings (or winding pairs) is switched off, the energy stored in the winding is safely transferred to the dc link capacitor (or another winding) without creating an excessive over-voltage event.

The converter is particularly well-suited to loads which can tolerate some variation in their received power and which operate at a switching frequency which lies outside the harmonic frequencies specified in the EMC standards. Switched, high speed motors such as switched reluctance motors which drive a load such as an impeller are particularly well-suited to being driven by a converter of this kind, since some variation in the operating speed of the impeller can be tolerated. Surprisingly, the actual variation in the operating speed of an impeller has been found to amount to less than 1% of the normal operating speed due to the high inertia of a fast-moving rotor and impeller.

The impeller can form part of a fan or pump for moving a fluid, such as a gas or a liquid, along a flow duct. In the field of appliances, the impeller can form part of a fan for drawing dirty air into a vacuum cleaner. In these types of application it is not critically important that the impeller always operates at a precise speed.

BRIEF DESCRIPTION OF THE DRAWINGS

Embodiments of the invention will now be described with reference to the drawings, in which.

DETAILED DESCRIPTION OF THE INVENTION

By way of comparison, and to provide a better understanding of the present invention, the conventional technique of active power factor correction will now be described in more detail with reference to FIGS. 4-11.

Figure 1:
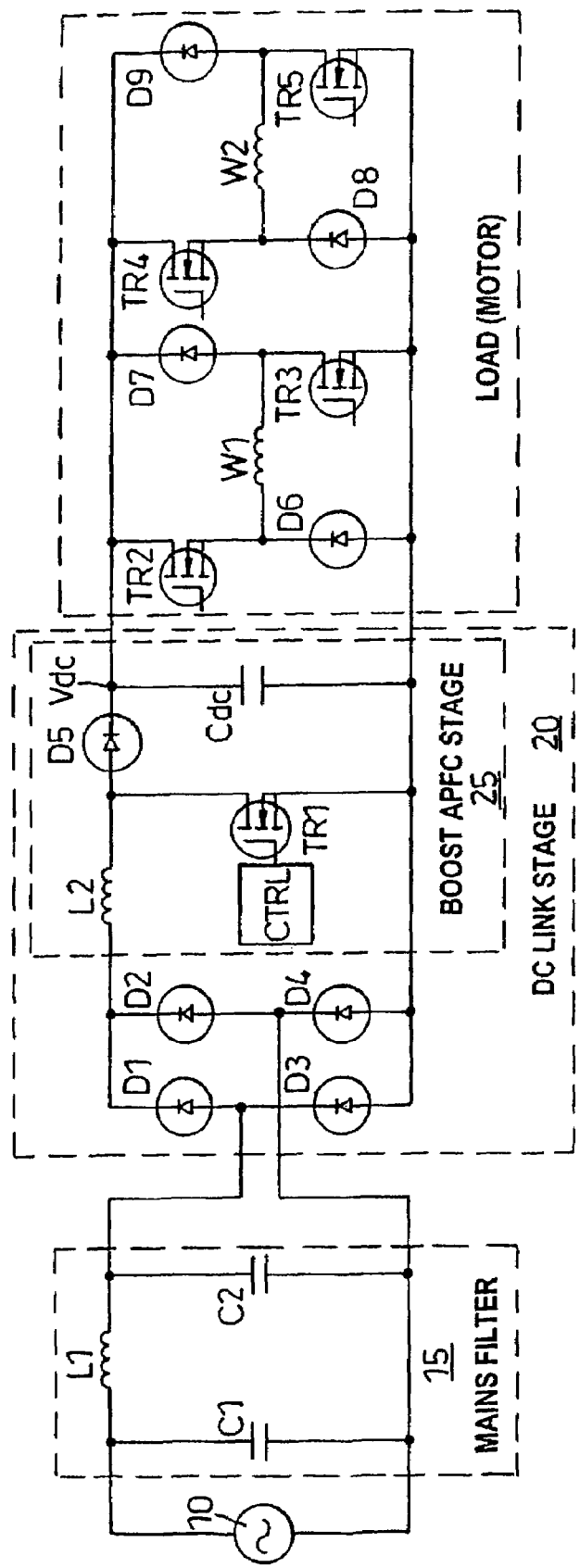
FIG. 1 shows a known form of power converter for supplying power to a motor, using a boost APFC stage.
Figure 2:
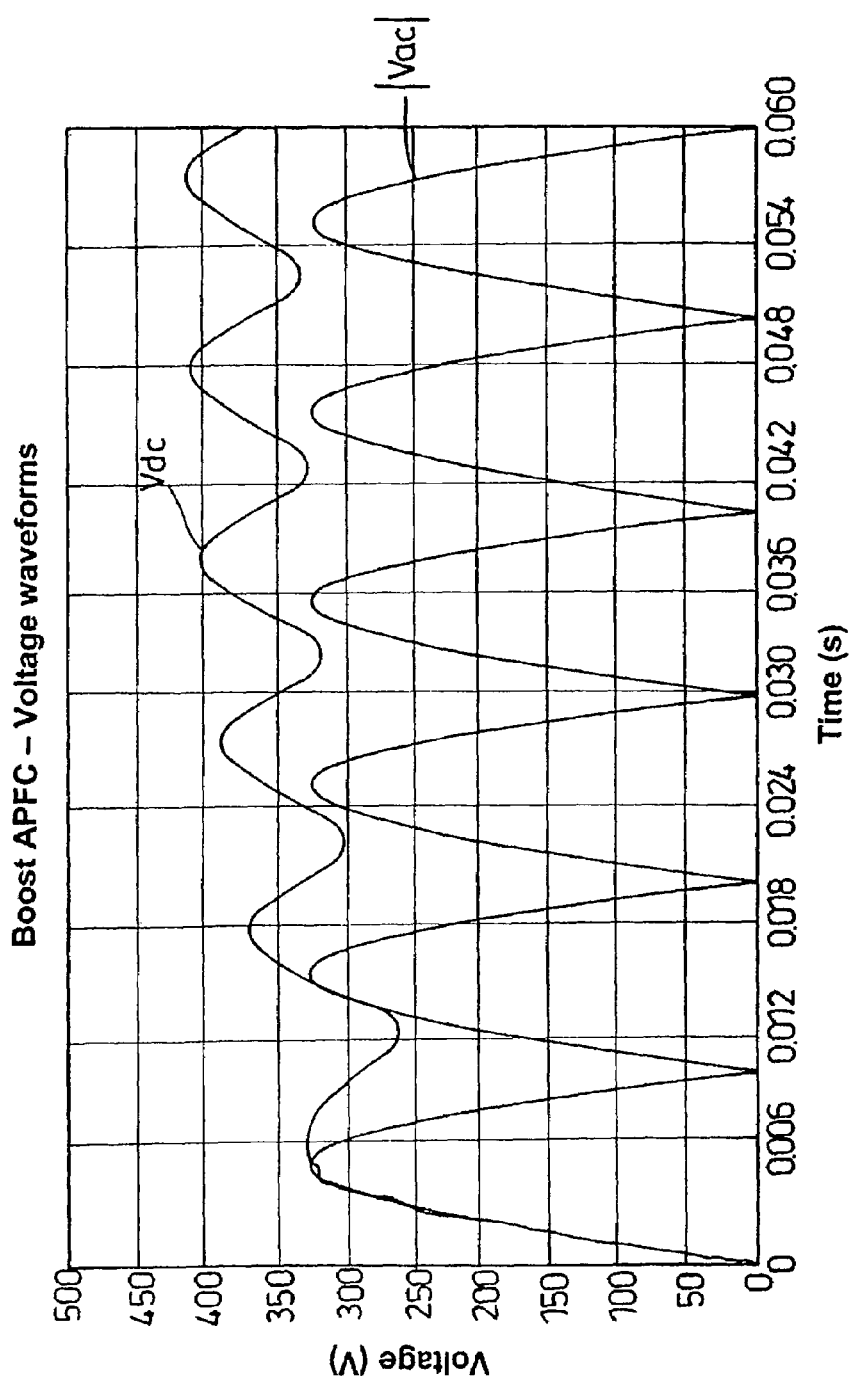
FIGS. 2 and 3 show the performance of the power converter of FIG. 1.
Figure 3:
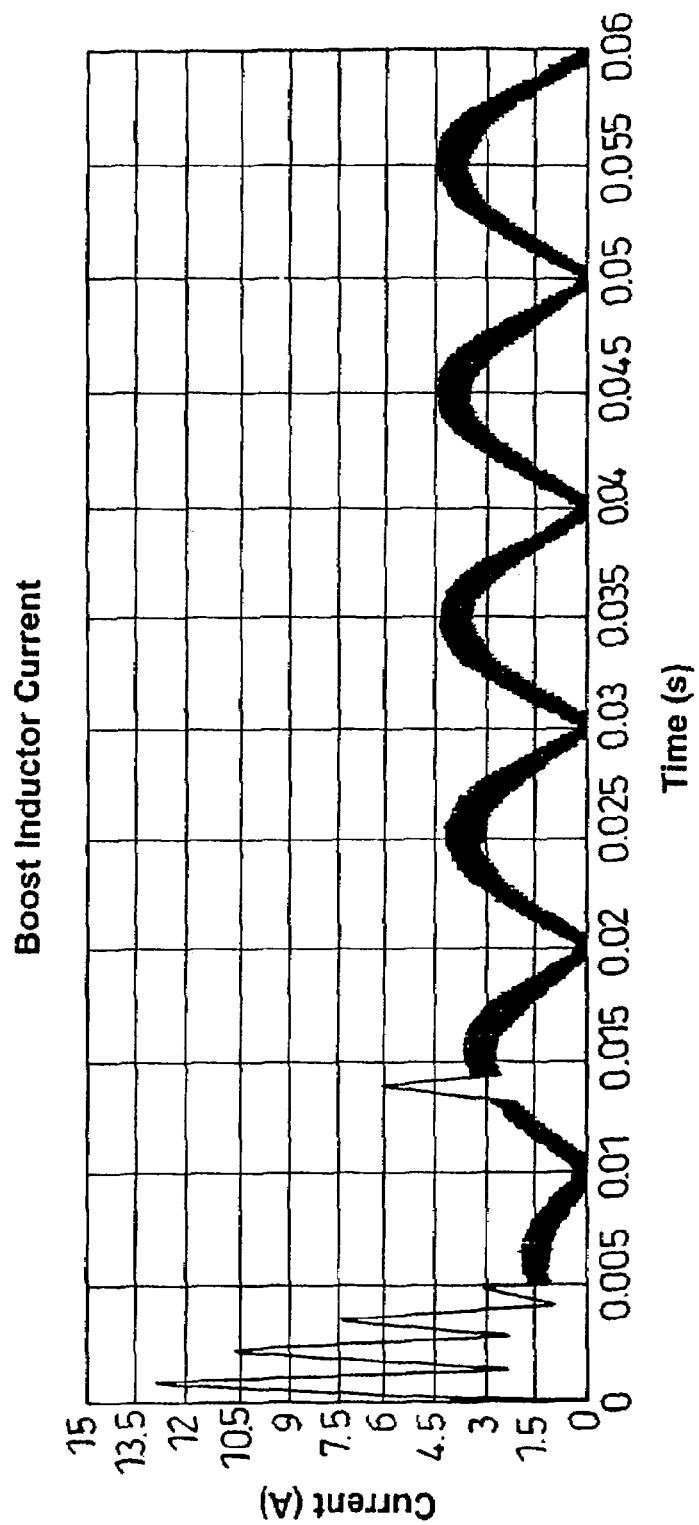
Figure 4:
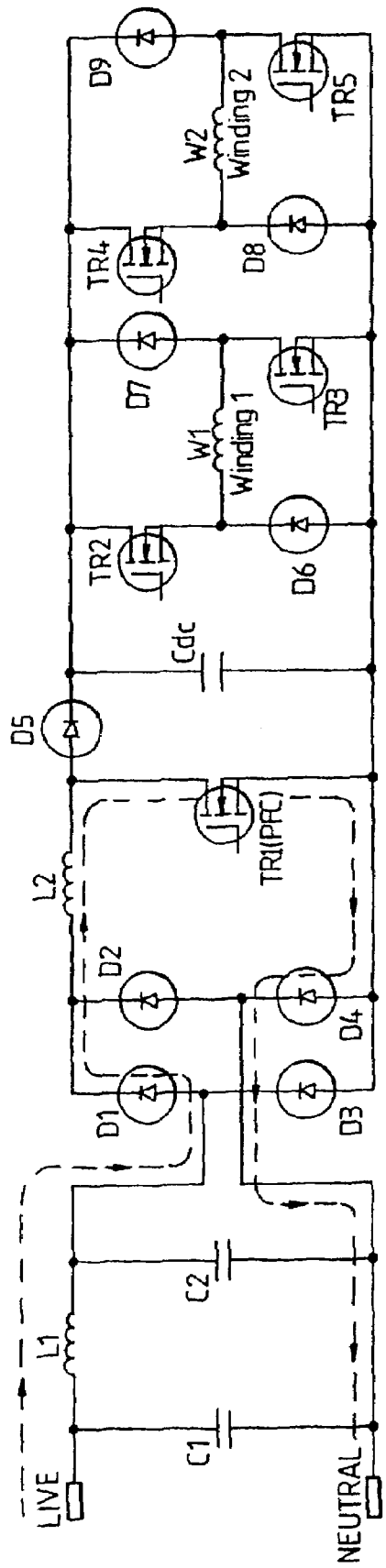
FIG. 4 shows a first operating state of the power converter of FIG. 1.
Figure 5:
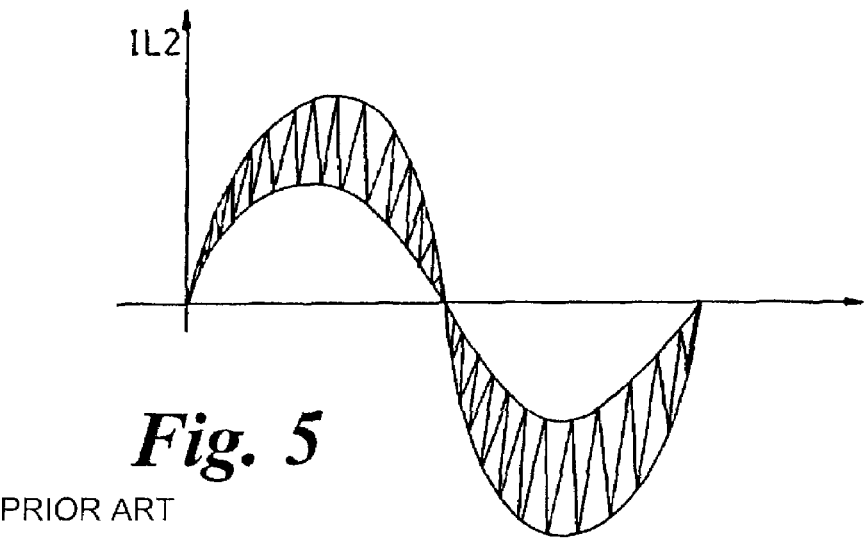
FIG. 5 shows the current drawn by the converter of FIG. 1.

Looking firstly at FIG. 4, the power factor correction circuit comprises an inductor L2 and a power switching device, such as a power transistor TR1, placed in parallel across the output of the bridge rectifier D1-D4. A diode D5 and capacitor Cdc are placed in parallel with the power switching device TR1, with the dc output being taken across capacitor Cdc.

FIG. 4 also shows a load in the form of a two-phase switched reluctance motor. The first phase comprises a pair of power switching devices TR2, TR3 in series with a winding W1. The winding W1 forms one of the stator phase windings of the motor. A pair of diodes D6, D7 provide a path for the 'free-wheeling' current through the winding when the switching devices TR2 and TR3 are switched off. A second phase of the motor has the same form as the first phase, comprising the power switching devices TR4, TR5, winding W2 and diodes D8, D9. The operation of switch TR1 of the PFC circuit is independent of the operation of the motor switches TR2 and TR3 (and TR4 and TR5). TR1 is controlled in a manner that actively shapes the input current whereas TR2, TR3 are controlled according to the required acceleration or steady state running of the motor.

For simplicity, in the following description certain assumptions have been made:

the voltage across the dc link capacitor (VCdc) is constant and greater than the peak rectified voltage;

the switching frequency of TR1 is much greater than the switching frequency of the load (i.e. the switching frequency of TR1 is greater than the switching frequency of TR2-TR5).

Three states of operation are shown in FIGS. 4-11.

State 1—FIG. 4

The PFC switch TR1 is on and switches TR2, TR3 are off. The period during which TR1 is switched on is chosen so as to actively shape the input current. Current flows from the ac supply, through the bridge rectifier D1-D4, inductor L2 and TR1. The on/off time of TR1 is chosen so that the current through inductor L2 (and thus the input current IL2) has the shape shown in FIG. 5.

Figure 6:
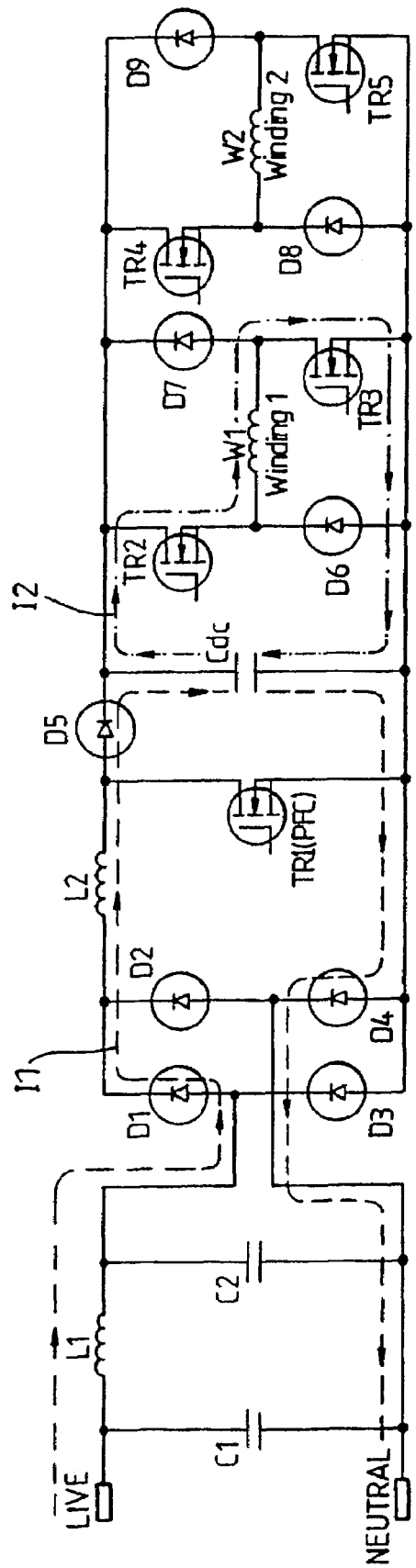
FIG. 6 shows a second operating state of the power converter of FIG. 1.

State 2—FIG. 6

TR1 is off while TR2 and TR3 are on.

Figure 7:
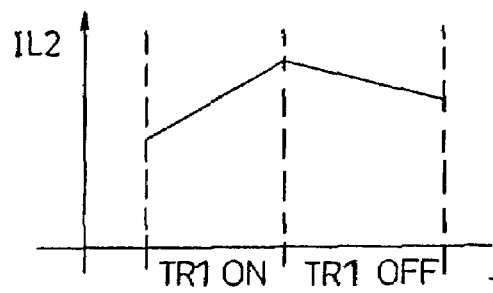
FIG. 7 shows the variation in current between the first and second operating states of the power converter of FIG. 1.

There are two current loops:

I1: With TR1 off, energy stored in L2 is transferred to Cdc, which results in a net reduction in the current in L2 as shown in FIG. 7.

I2: In the second loop, energy stored on Cdc is released through winding W1.

Figure 8:
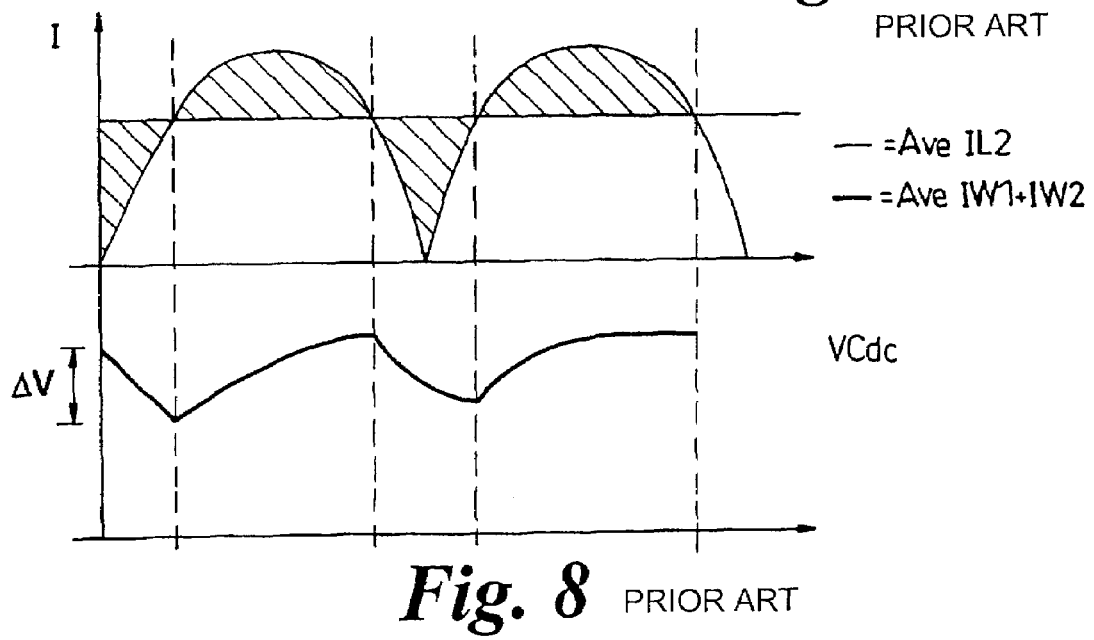
FIG. 8 shows current waveforms for the power converter of FIG. 1.

The net current flowing into Cdc is I1-I2. The average currents over a period of time are shown in FIG. 8. It can be seen that capacitor Cdc must, at any time, make up the difference between input current IL2 and the output current (IW1+IW2). This causes a voltage ripple on Cdc of the form shown in FIG. 8. The maximum ripple is ΔV. The size of ΔV is inversely related to the capacitance of Cdc, i.e. a small voltage ripple ΔV requires a large capacitance.

Figure 9:
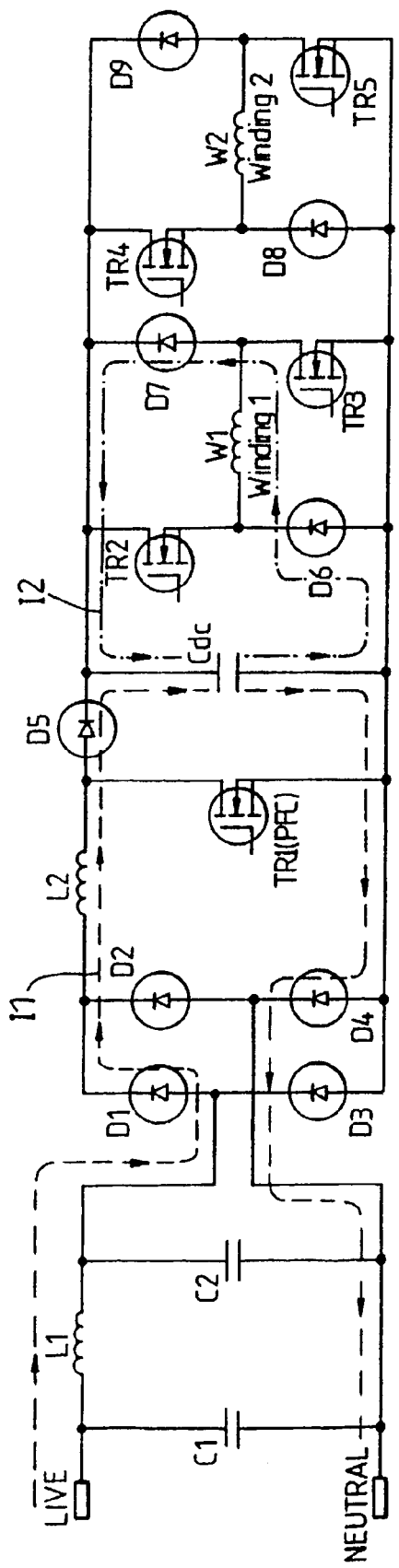
FIG. 9 shows a third operating state of the power converter of FIG. 1.
Figure 10:
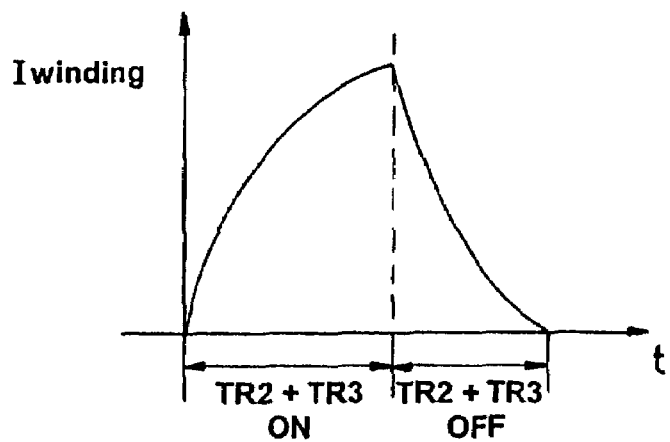
FIG. 10 shows current flow in the winding of the motor shown in FIG. 1.

State 3—FIG. 9

TR1 is off while TR2 and TR3 are off.

There are two current loops:

I1—With TR1 off, energy stored in L2 is transferred to Cdc.

I2—With TR2 and TR3 off, the current in winding W1 reduces and is recovered back to Cdc.

While they are not shown, the current flows for winding W2 are the same as for winding W1.

Figure 11:
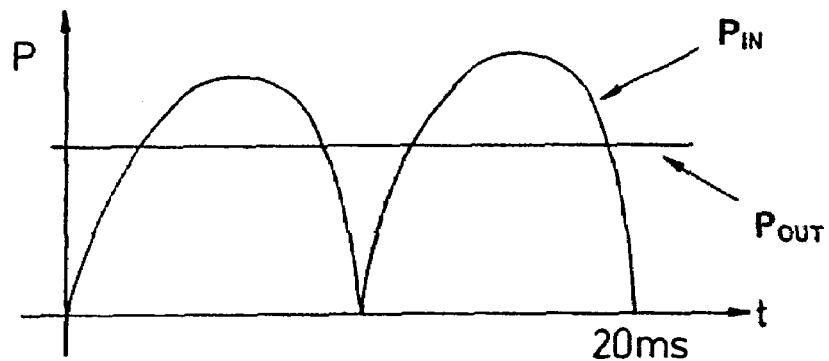
FIG. 11 shows power flows both into and out of the power converter of FIG. 1.

It should be clear from the above that while the overall input power $P_{IN}$, i.e. power taken from the ac supply, is the same as the overall output power $P_{OUT}$, i.e. power delivered to the load, over one cycle of the mains supply, the input power profile is very different to the output power profile, as shown in FIG. 11. Capacitor Cdc copes with the instantaneous difference between input power and output power. For a high power load, this demands that Cdc must have a large value. As an example, for a 1.5 kW load, Cdc must have a value of around 200 μF.

In summary, this scheme provides a good, stable, output voltage Vdc and the shape of the input current drawn from the supply is compatible with EMC standards, i.e. the dominant frequency component is the same frequency as the ac mains frequency with the much higher switching frequency of switch TR1 superimposed on the 50 Hz signal. Input current rises as TR1 is turned on and falls as TR1 is turned off. The penalties of this scheme are that the capacitor Cdc must have a large value, requiring a capacitor which is both physically large and expensive.

Small DC Capacitor Scheme

Figure 12:
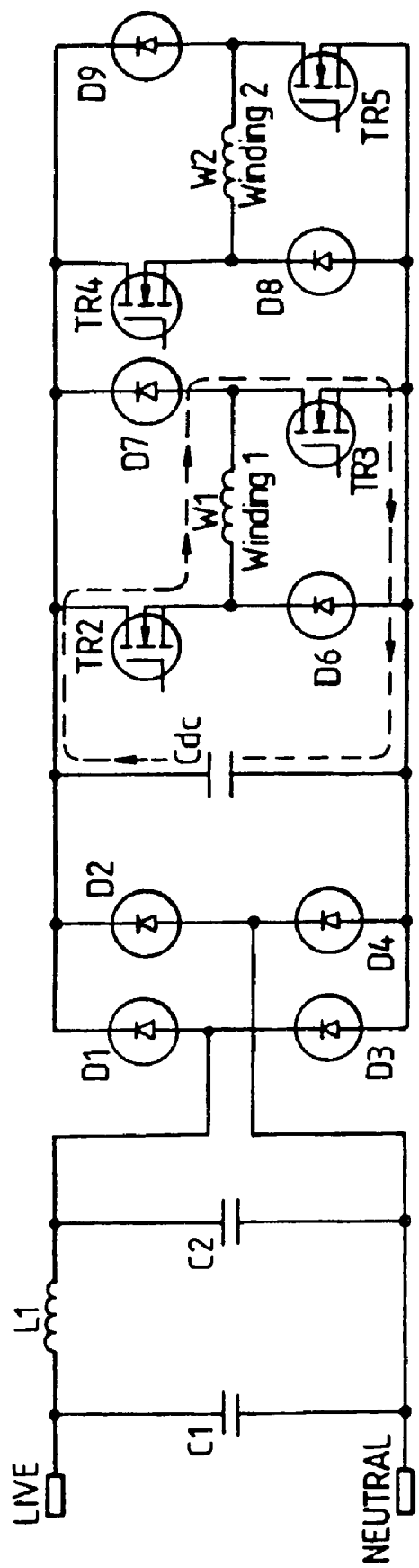
FIG. 12 shows a first operating state of a power converter in accordance with an embodiment of the present invention.

With the scheme according to the invention, as shown in FIG. 12, the mains filter (C1, C2, L1) and bridge rectifier (D1-D4) are retained. However, in place of the inductor L2, switch TR1, diode D5 and large capacitor Cdc, there is now only a single link capacitor Cdc. The link capacitor Cdc has a capacitance which is of a considerably smaller value than that of the larger capacitor Cdc shown in FIGS. 1-11. The same two-phase motor serves as the load, as before.

Figure 18:
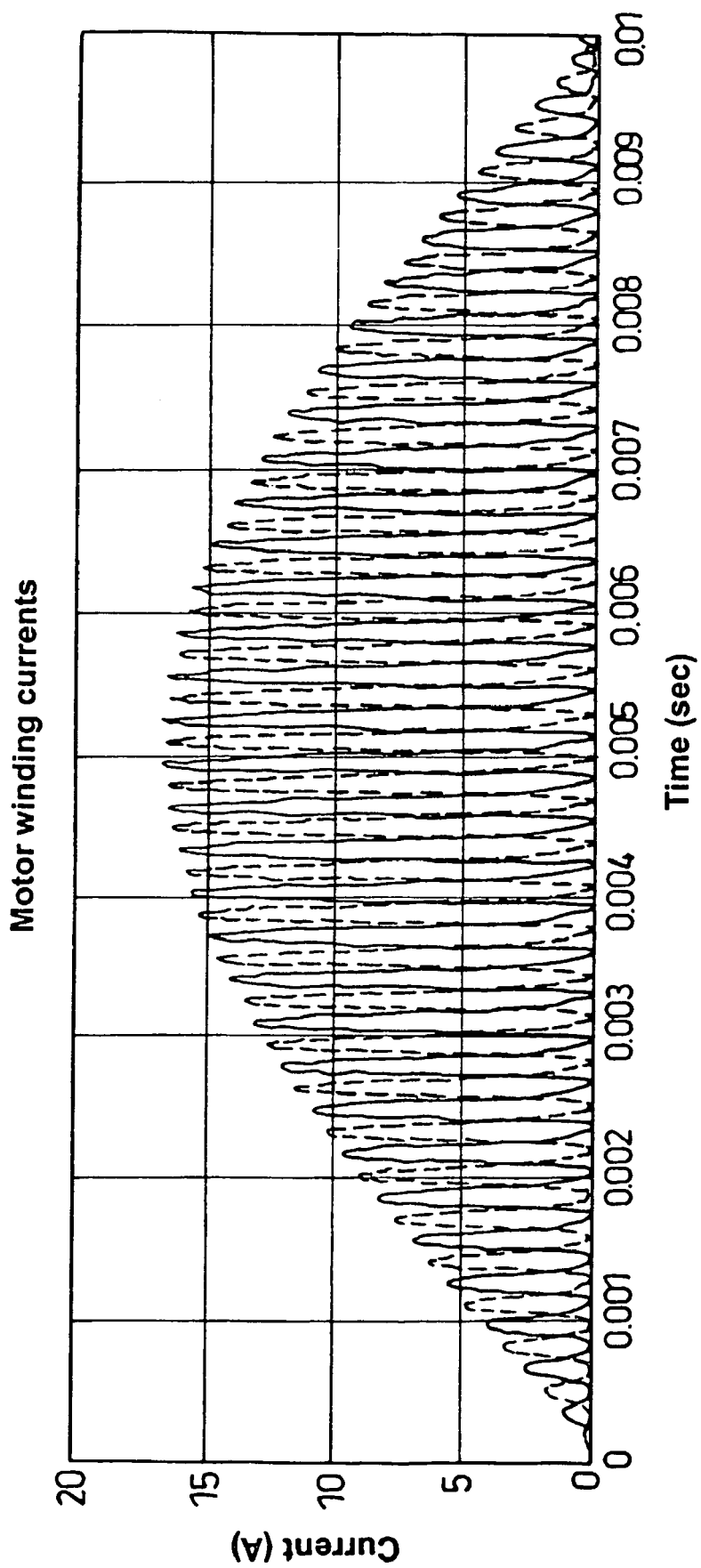
FIG. 18 shows current flows through the motor windings shown in FIG. 12.

In overview, this scheme has the effect that, each time one of the motor phases is energised, the energy stored in the link capacitor Cdc is rapidly removed to the point where the rectifier diodes D1-D4 begin to conduct and the required motor power is taken directly from the mains supply. The continuous pulsing of power directly from the mains supply to the motor windings W1, W2 results in a similarly pulsed input current waveshape, shown in FIG. 16. The input 'π' filter formed by C1, C2 and L1 reduces the peak input current to an acceptable level and introduces a continuous current wave-shape similar to that for an actively controlled boost APFC stage. The resulting currents in the windings W1 and W2 are shown in FIG. 18.

Operation of the circuit will now be described in more detail. Four states of the circuit will be described.

State 1—FIG. 12

Figure 13:
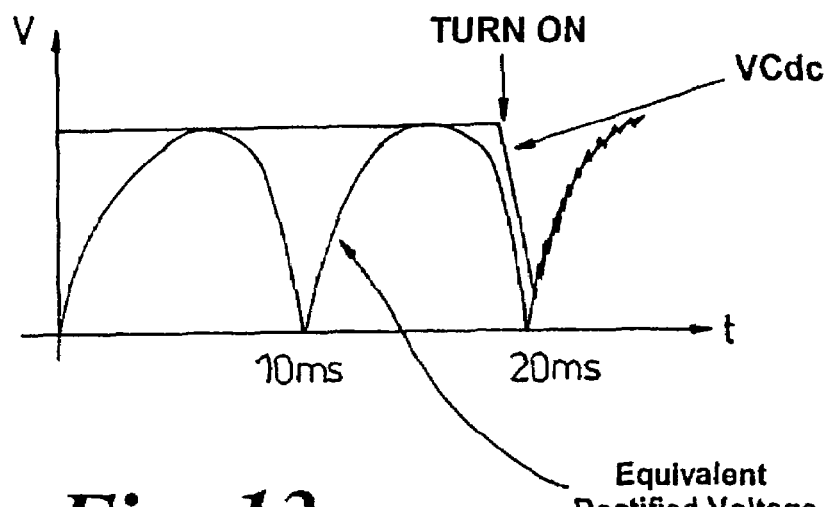
FIG. 13 shows voltage waveforms in the power converter of FIG. 12.

TR2 and TR3 are switched on to energise the winding W1. Just before TR2 and TR3 are turned on, the voltage across Cdc is equal to the mains peak voltage, minus the voltage across two of the bridge rectifier diodes. As TR2 and TR3 are turned on, the voltage across Cdc falls very quickly to the instantaneous value of the rectified mains supply, as shown in FIG. 13. The voltage across Cdc falls very quickly because of the small capacitance of Cdc.

Figure 14:
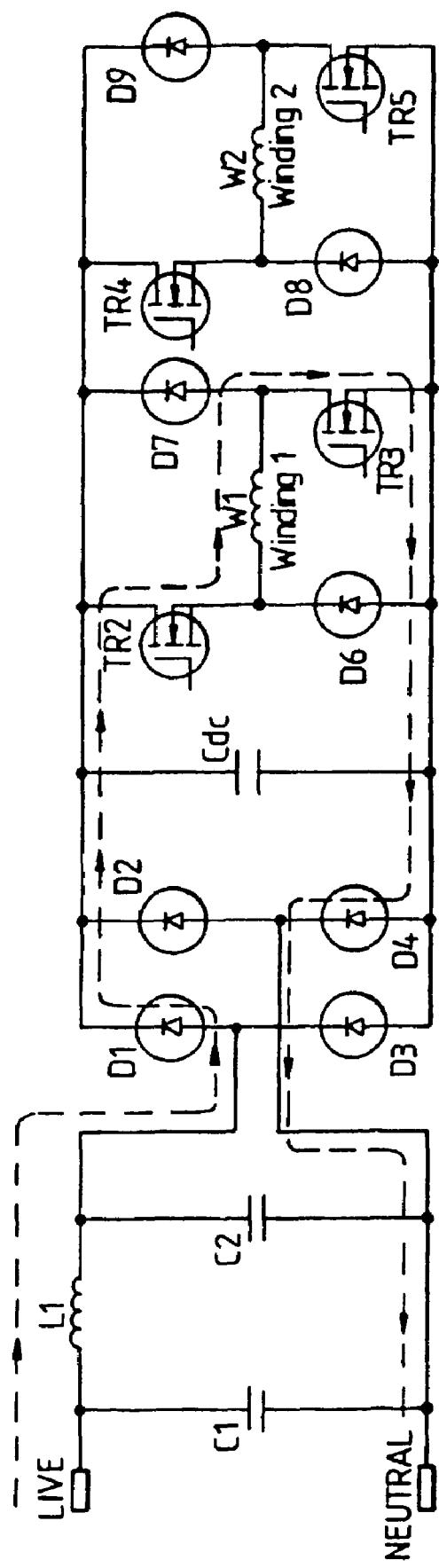
FIG. 14 shows a second operating state of the power converter shown in FIG. 12.

State 2—FIG. 14

TR2 and TR3 remain switched on to energise the winding W1.

When VCdc falls to the rectified voltage level, the current/power supplied to the load is no longer supplied only by the capacitor Cdc but is also drawn directly from the mains supply, as shown by the current flow in FIG. 14. Because Cdc stores very little energy, VCdc is forced to follow the rectified input voltage. This results in a voltage ripple on Cdc of around 85-100%.

Power flow to the load (motor windings) is dominated by flow from the mains supply to the windings. There is no significant intermediate energy storage, as in the boost APFC stage previously described.

Figure 15:
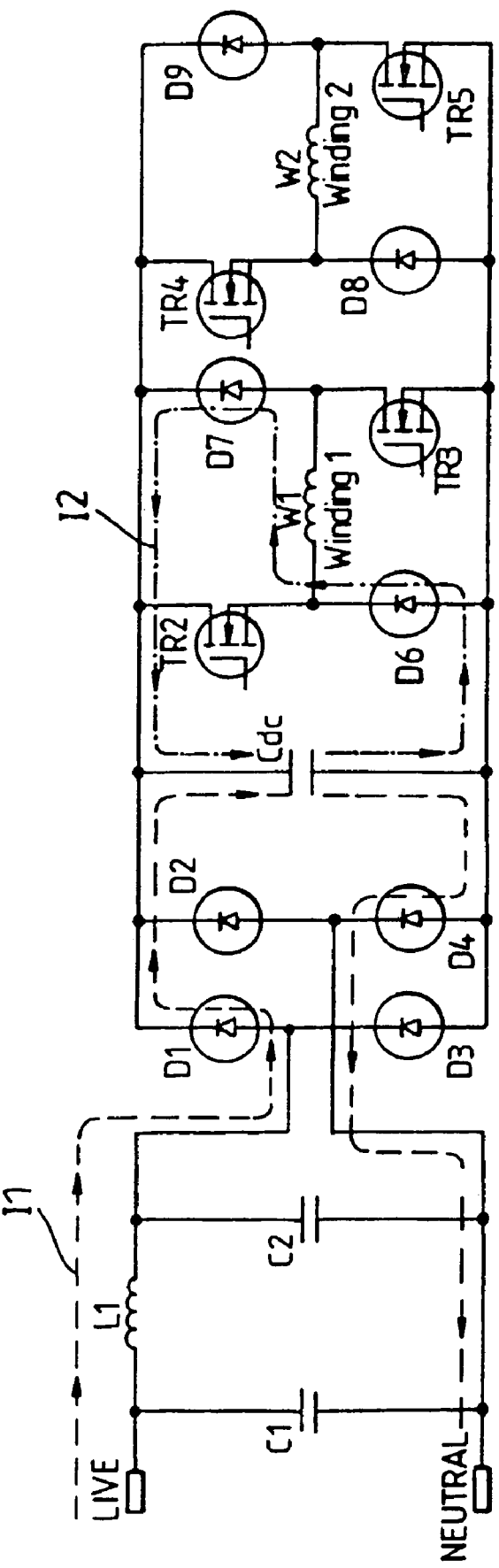
FIG. 15 shows a third operating state of the power converter shown in FIG. 12.

State 3—FIG. 15

TR2 and TR3 are switched off.

There are two current flows:

I1—C1, C2 and L1 form an input filter which reduces the switching frequency (motor) component of the input current. When TR2 and TR3 are turned off, current continues to flow in L1.

I2—After TR2 and TR3 have been turned off, current continues to flow through winding W1 and is recovered to Cdc.

The size of capacitor Cdc is heavily dependent upon the total energy transferred from winding W1 and from the inductor L1 forming part of the input filter during the time that T2 and TR3 are switched off. It is also heavily dependent upon the total energy transferred from winding W2 and from the inductor L1 during the time that TR4 and TR5 are switched off. The capacitance is selected so that the maximum voltage applied across the capacitor Cdc is kept within a predetermined limit: in the embodiment described, that limit is selected to be 400-500V.

Figure 17:
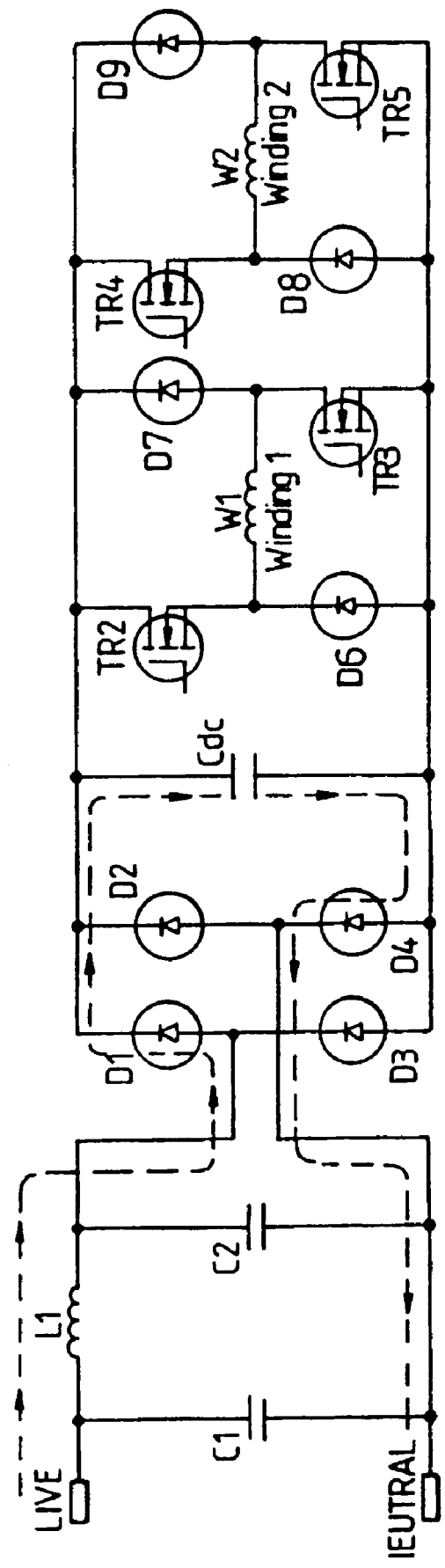
FIG. 17 shows a fourth operating state of the power converter shown in FIG. 12.

State 4—FIG. 17

TR2 and TR3 are switched off.

Here, all of the energy stored in the winding has been recovered and hence the winding current has fallen to zero. Current still flows into the inductor of the input filter L1 and charges Cdc.

Figure 16:
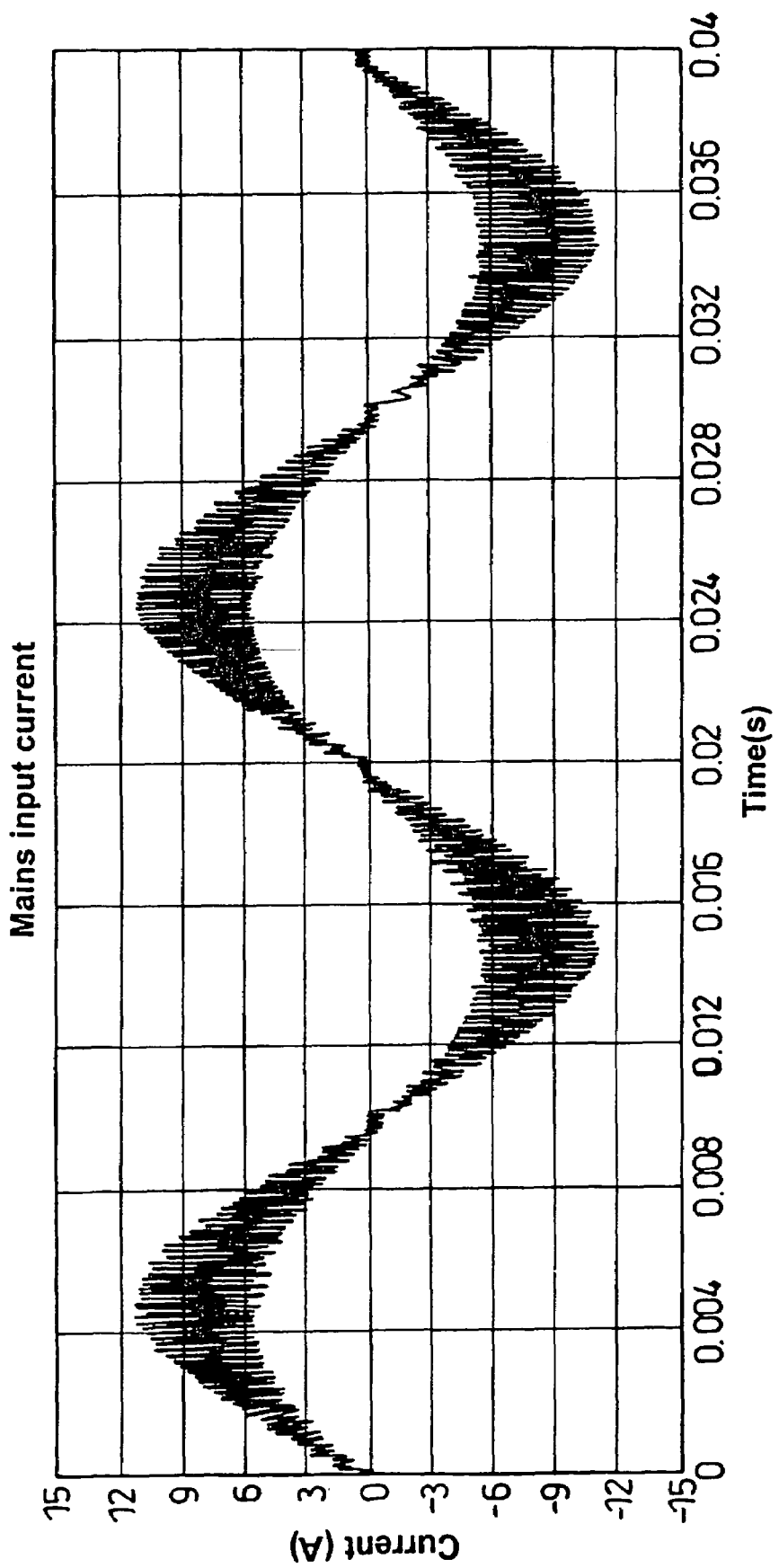
FIG. 16 shows current drawn from the supply by the power converter of FIG. 12.
Figure 19:
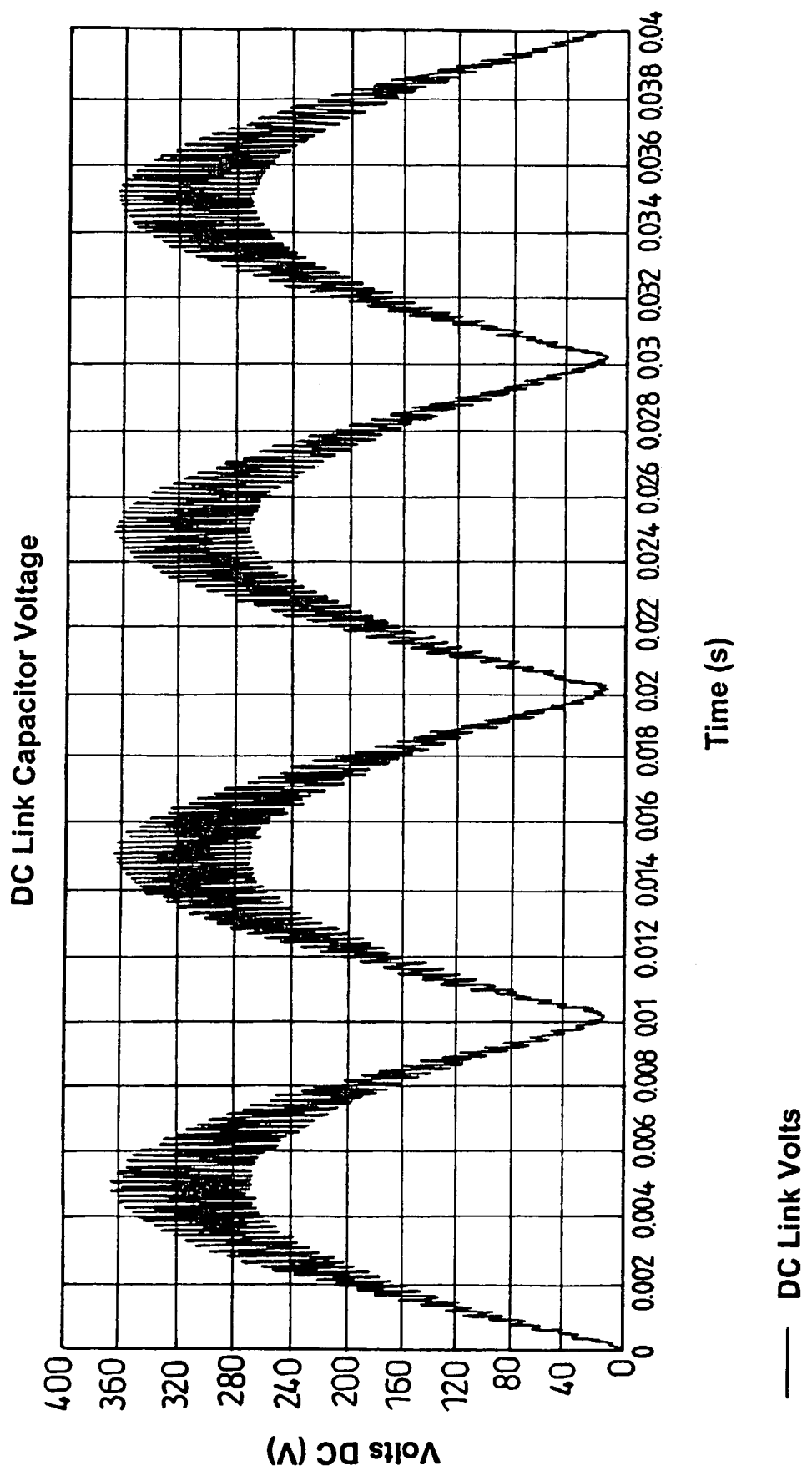
FIG. 19 shows voltage across the dc capacitor shown in FIG. 12.

FIG. 16 shows the input current drawn from the ac supply. It can be seen that the input current has a significant component at the frequency of the mains supply, and is modulated at the switching frequency of the load. The input filter (C1, C2, L1) restricts the size of the component at the switching frequency, and it is preferable to match the input filter to the switching frequency. The provision of the small dc link capacitor Cdc allows the current drawn by the load closely to follow the mains supply. The size of the dc link capacitor Cdc is chosen in accordance with the work demanded by the load applied to the dc link. As described above, for a load in the form of a pulsed motor winding, the dc link capacitor Cdc must be large enough to accept all of the energy transferred from de-energised phase windings without exceeding the voltage capability of the components, as shown in FIG. 19.

It is acknowledged that this circuit arrangement is not suitable for all types of load. Firstly, the large (near 100%) ripple component on the dc link voltage causes a significant variation, over the course of one cycle of the supply, of the power supplied to the load. When the load is a motor, this has the effect that the speed of the motor will vary about an average value at a frequency equal to twice the frequency of the mains supply. Secondly, current pulses, at the switching frequency of the load, appear in the input current. This demands that the switching frequency of the load must be sufficiently high to lie outside the strictly regulated bands set out in the EMC standards. However, even in view of the above, this circuit arrangement is well-suited to many types of pulsed loads, such as a motor where the switching frequency is high and where it is acceptable for the speed of operation to vary with the mains frequency. The load should have a high operating frequency, of the order of 2 KHz or more, in order to comply with current EMC requirements, which makes this arrangement best suited to high speed motors, such as those operating at speeds in excess of approximately 35,000 rpm. Surprisingly, it has been found that the variation in input power does not have a significant effect on the speed of the motor. Indeed, for a motor operating at 95,000 rpm, a peak-to-peak variation of 800 rpm has been observed.

A number of other changes have been found to be required for optimum operation of the new converter with a pulsed current load.

It is preferable to avoid any significant build-up of flux in the motor windings. To avoid flux build-up in any magnetic material, the volt-seconds applied during de-energisation must be substantially equal to the volt-seconds applied during energisation. For equal energisation and de-energisation periods, the flux build-up will be proportional to the voltage applied.

Figure 20:
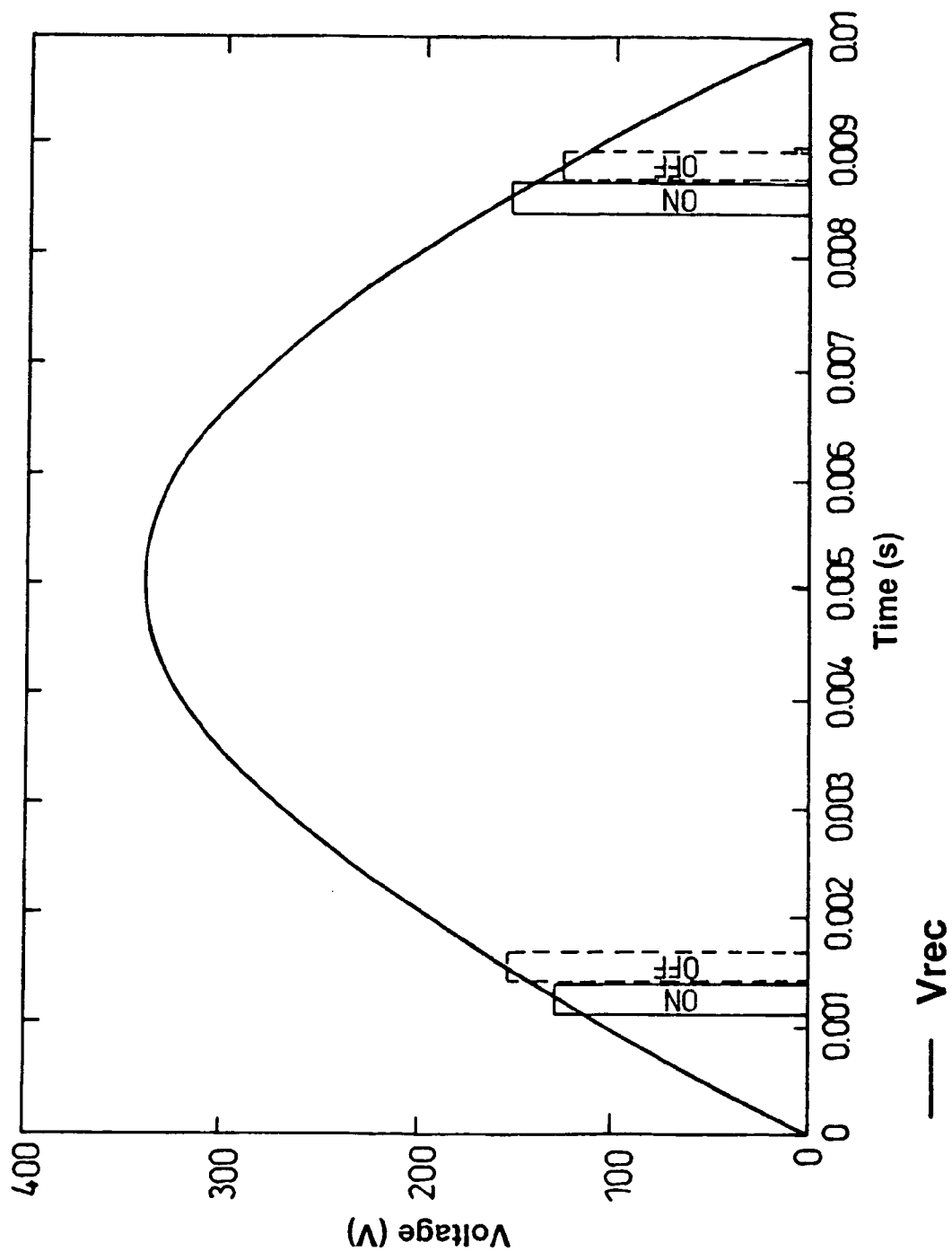
FIG. 20 shows the variation in voltage pulses supplied to the load shown in FIG. 12.
Figure 21A:
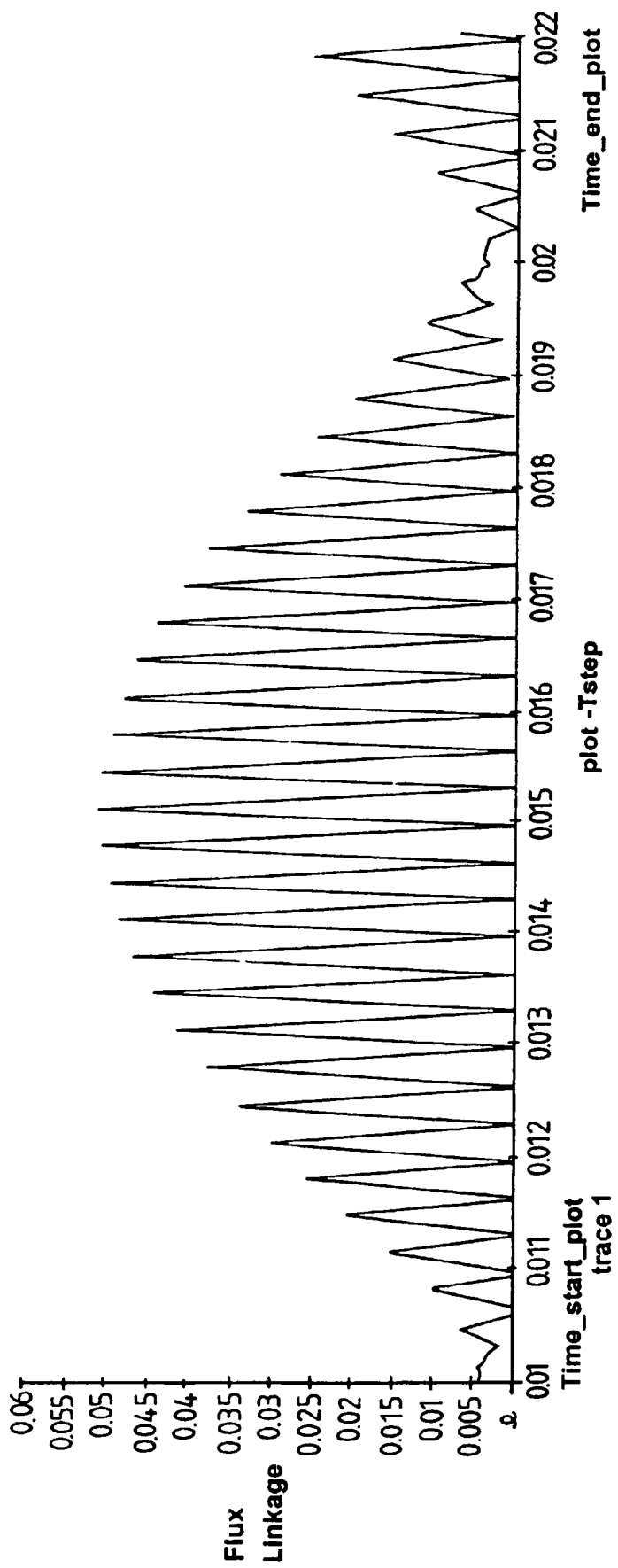
FIG. 21a illustrates flux build-up in the load shown in FIG. 12.

FIG. 20 illustrates the sequence of voltage pulses which are applied to the windings of the motor during one half cycle of the input supply. Due to the small value of Cdc, the input voltage varies widely during the half cycle. During 0<Time<0.005 s, the amplitude of the voltage pulse during the off period is greater than the amplitude of the voltage pulse during the immediately preceding on period and, as a result, flux build-up in the motor does not occur. However, during the period 0.005 s<Time<0.01 s the amplitude of the voltage pulse during the off period is less than the amplitude of the voltage pulse during the immediately preceding on period and, as a result, flux build-up will occur for equal periods of energisation and de-energisation. FIG. 21a illustrates how flux build-up can occur when the off period has the same duration as the on period.

Figure 21B:
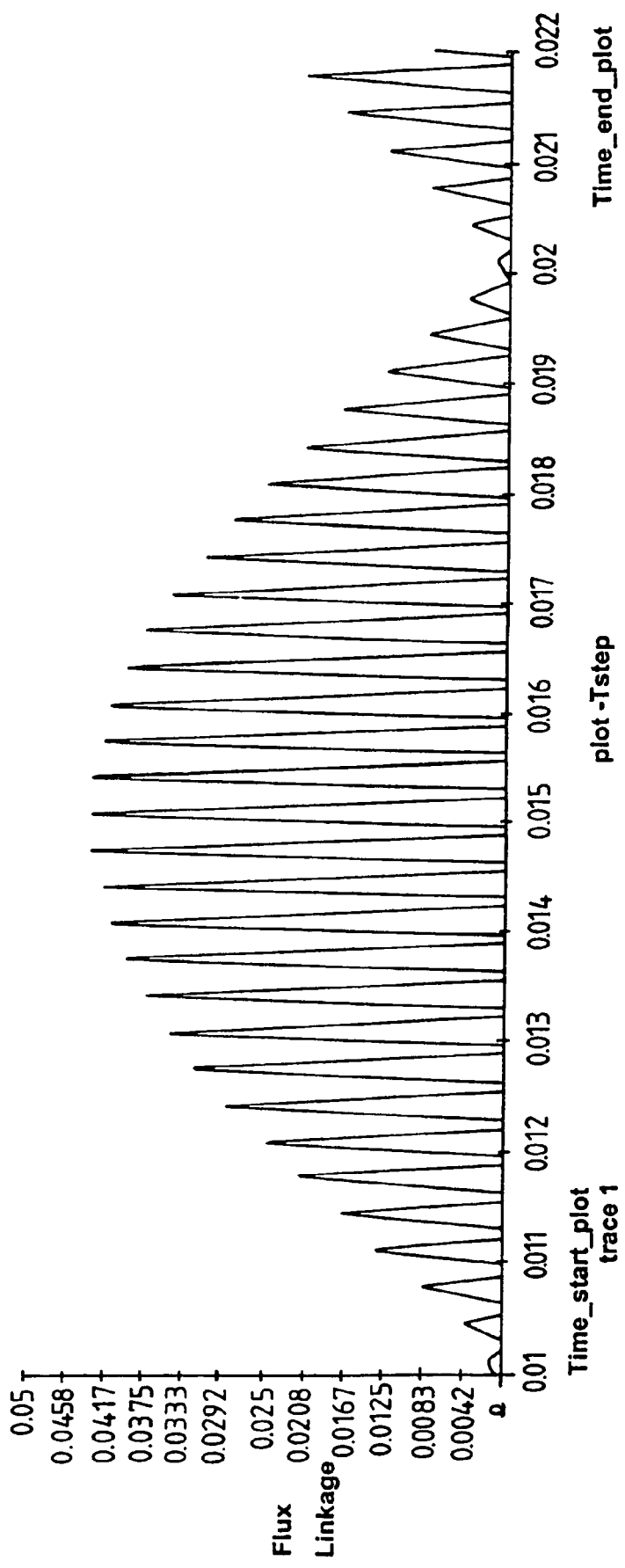
FIG. 21b illustrates the effect of reducing the conduction angle on flux build-up in the load shown in FIG. 12.

We have found that the problem of flux build—up in the motor illustrated in FIGS. 12-26 can be avoided by reducing the conduction angle, i.e. the duration of the energisation period or 'on' pulse. FIG. 21b illustrates how flux build-up can be avoided in this way.

There are other factors which must be considered before the energisation period is reduced. Excessive reduction of the energisation period will result in periods of no motor current, which will have a detrimental effect on the harmonic content of the input current drawn from the supply. Also, there will be a need to increase the peak current if the motor is to develop the same rated output power with a reduced energisation period.

A compromise has been found where the energisation period is reduced only to the point where the problem of flux build-up is eliminated. In the embodiment of a high speed motor, we have found that acceptable results can be achieved by reducing the conduction angle from 90° to 82°. Of course, the conduction angle will differ for other applications.

The value of the dc link capacitor Cdc is only governed by the requirement to absorb recovered energy from the motor, particularly during motor acceleration. During normal operation of the motor, when a phase winding is de-energised the energy stored in that winding is fed back to the dc link capacitor Cdc. This recovered energy can be as high as 33% of the rated power of the motor. As a result of absorbing the recovered energy from the winding, the capacitor voltage increases. Sizing of the dc link capacitor Cdc must take this voltage rise into account, to ensure none of the components connected to the dc link capacitor Cdc suffer over-voltage events. It will be appreciated that power electronic components are sensitive to over-voltage events.

Figure 22:
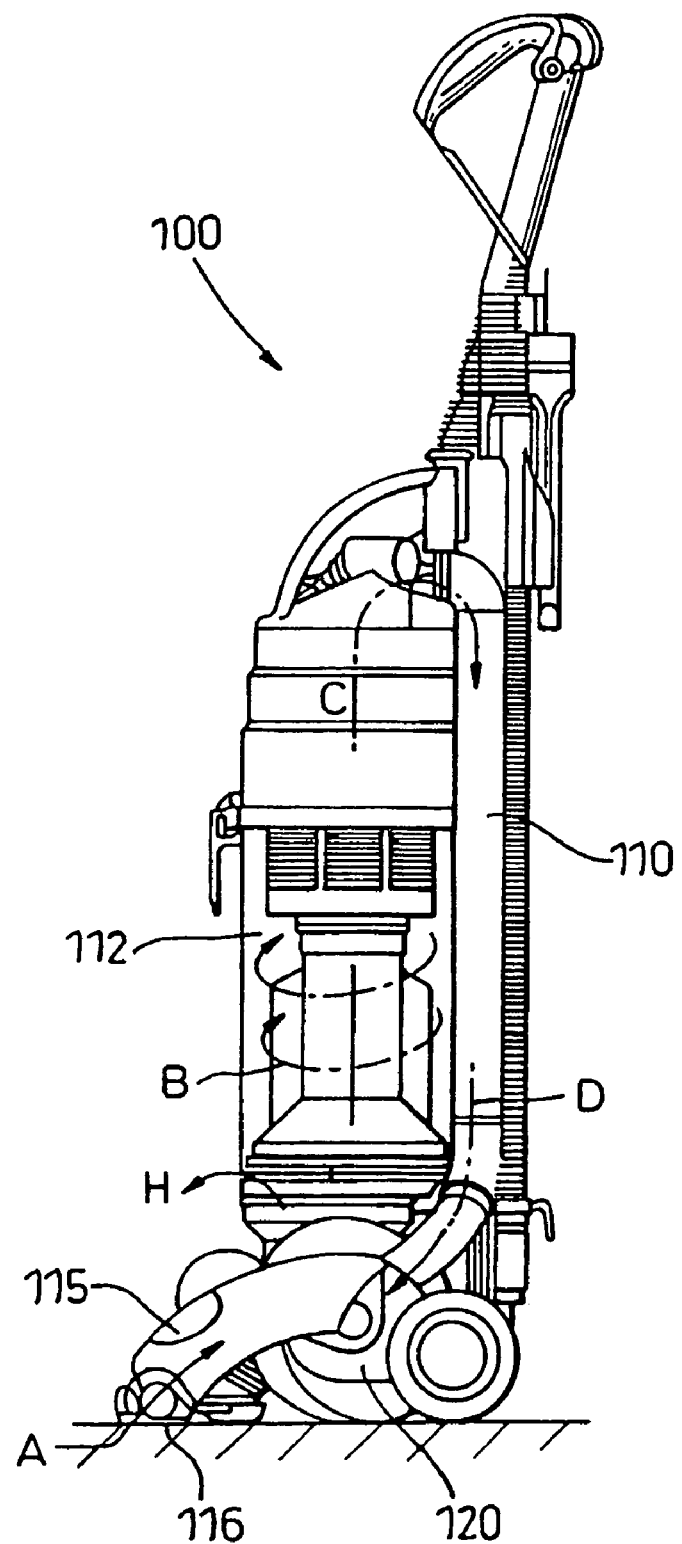
FIGS. 22-24 show the application of the power converter of FIG. 12 to a vacuum cleaner.
Figure 23:
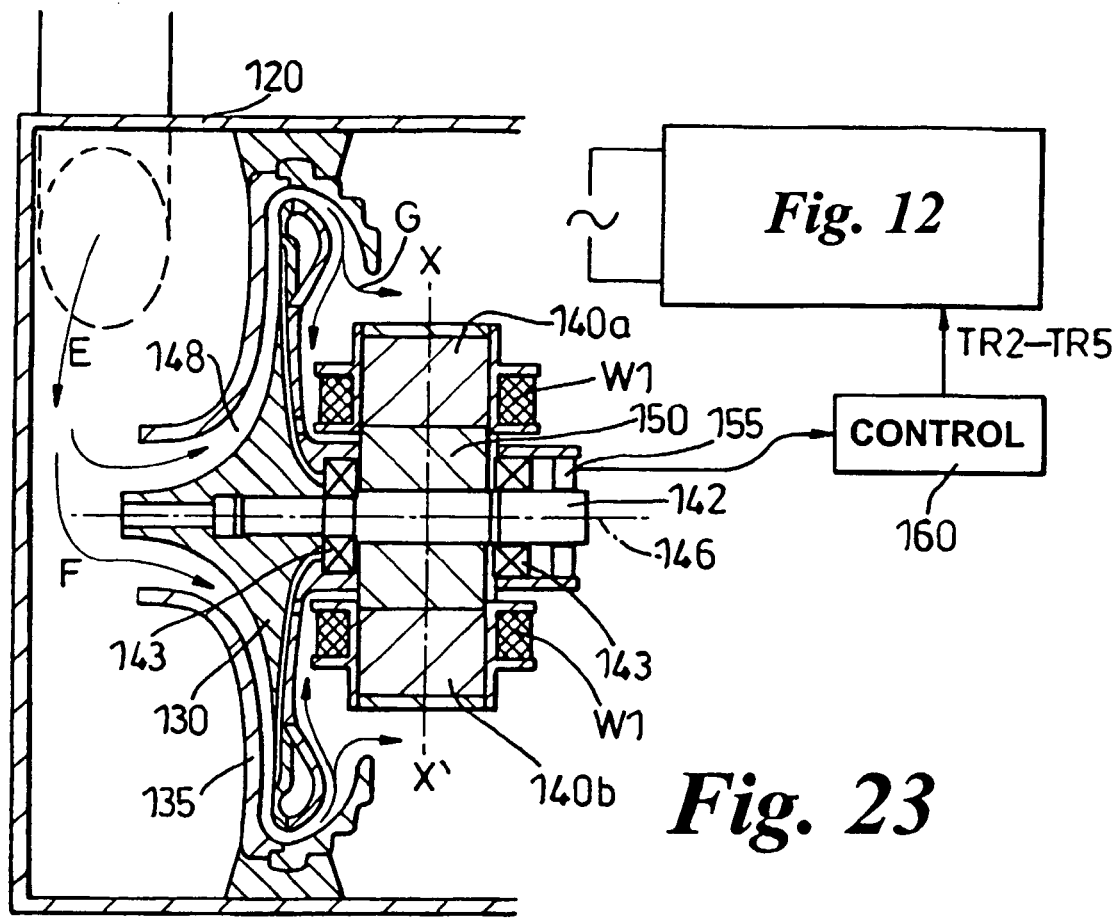
Figure 24:
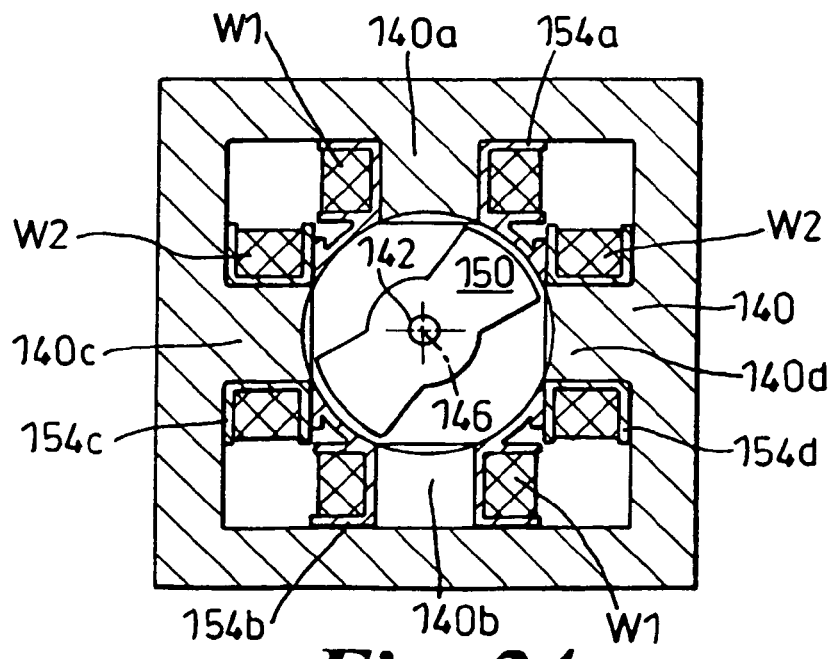

FIGS. 22-24 show the application of the power converter to driving an impeller of a suction fan in a vacuum cleaner. The vacuum cleaner shown here is an upright type of vacuum cleaner but the vacuum cleaner could equally be a cylinder type of vacuum cleaner. As shown in FIG. 22, the vacuum cleaner 100 comprises an upstanding main body 110 with a fan and motor casing 120 at its lower end for housing a motor and fan unit. A cleaner head 115 is mounted in a freely articulated fashion on the motor casing 120. A suction inlet 116 is provided in the cleaner head 115 through which dirt and dust can be drawn from a floor surface. The main body 110 supports separating apparatus 112 in the form of a cyclonic separator which can separate dirt, dust and other debris from a dirty airflow drawn in through the inlet 116.

The fan and motor housing 120 supports an impeller 130 and a motor to drive the impeller 130. In use, the motor rotates the impeller 130 at a very high speed (of more than 70,000 rpm) to draw air along the paths A-H through the cleaner 100. Dirt-laden air is drawn into the cleaner head 115 via the dirty air inlet 116. The dirt-laden air is carried by ducting to a separator 112 which serves to separate dirt, dust and other debris from the air flow (path B). The separator 112 can be a cyclonic separator, as shown here, or some other form of separator, such as a filter bag. Cleaned air leaves the separator 112 along paths C, D before entering, via path E, the fan and motor housing 120. A pre-motor filter is usually placed in the airflow path before the impeller 130 to filter any fine dust particles which were not removed by separator 112.

FIGS. 23 and 24 show the impeller 130 and motor which are housed in the motor housing 120. Sets of bearings 143 support a shaft 142 which is rotatable about an axis 146. The impeller 130 is coaxially mounted on the shaft 142 at the upstream end of the shaft 142. Blades extend radially outwardly from the main body of the impeller 130 towards the housing 135 within a channel 148 and, in use, serve to draw air into the housing 135 in the direction shown. Shaft 142 is driven by the motor which, in this embodiment, is a switched reluctance motor. The motor has a stator 140 and a rotor 150 which is rotatably mounted within the stator 140. FIG. 24 is a section through the motor along X-X' of FIG. 23. The motor is a two pole, two-phase switched reluctance motor. It comprises a stator 140 having four salient poles 140a, 140b, 140c and 140d. Each pole 140a-140d has a number of turns of insulated wire wound around it. The turns on opposing pairs of poles are joined in series to form one winding, e.g. the turns on poles 140a, 140b form winding W1 shown in FIG. 12 and the turns on poles 140c, 140d form winding W2 shown in FIG. 12.

The circuit shown in FIG. 12 is used to power and drive the motor. A control system 160 is also provided. The shaft 142 has a sensor 155 for detecting the angular position of the rotor 150. In use, the control system 160 uses the information from the sensor 155, together with other information, to energise sequentially the windings W1 and W2 and hence to cause the rotor 150 and the impeller 130 to rotate about the axis 146, drawing air into the housing 135 along path F and exhausting air along path G. The windings W1, W2 are energised by turning TR2-TR5 on and off in the manner previously described. Control systems of this kind are well known and do not need to be described further.

For a two-phase switched reluctance motor with a normal operating speed of around 95,000 rpm, we have found that the following component values, for the circuit shown in FIG. 12, provide good results:

C1=C2=220 nF;
L1=330 μH
Cdc=6.6 μF

Figure 27:
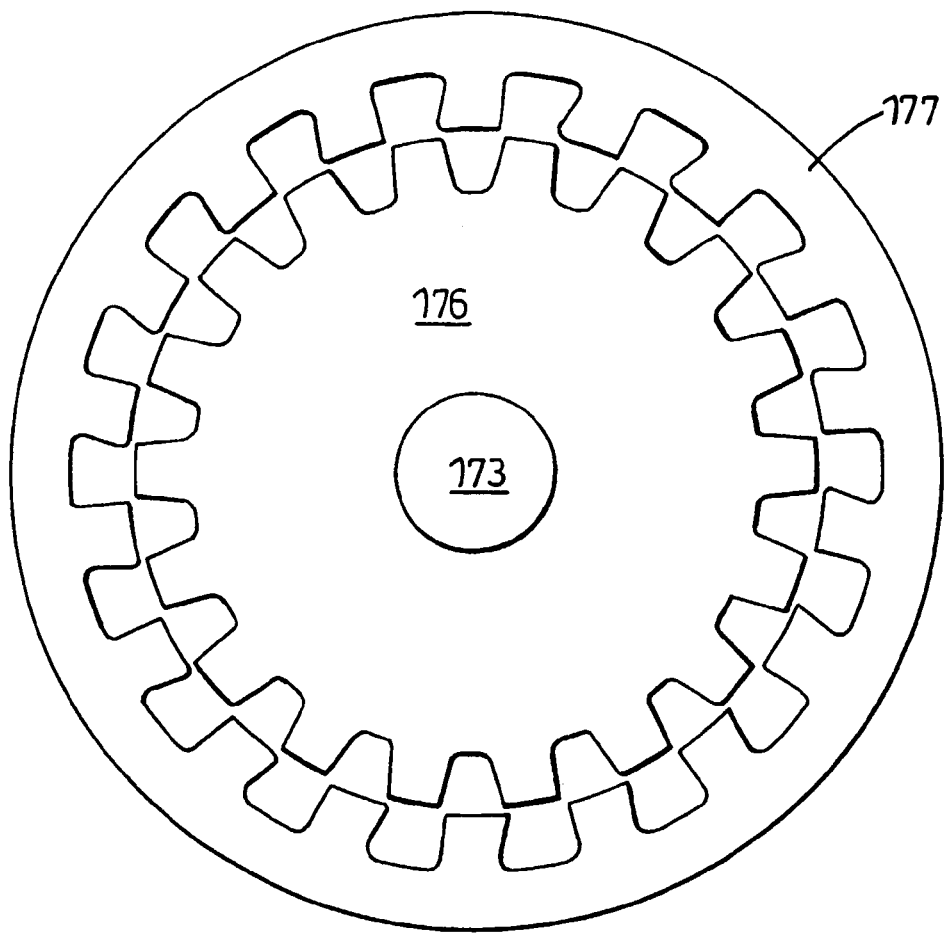
FIGS. 27 and 28 are schematic sectional views, from the side and front, showing the application of the power converter of FIG. 12 to the agitator of a surface-treating device.
Figure 28:
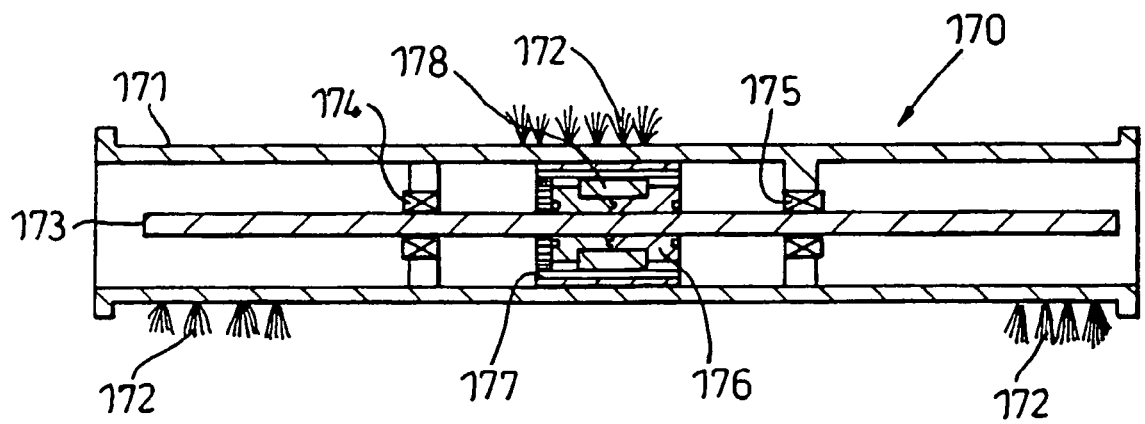

The motor illustrated in FIGS. 23 and 24 has a small number of poles and a high operating speed. The invention is equally applicable to other loads having a high switching frequency, such as a motor having a large number of poles and a low operating speed. An example of such a load is a surface-treating device, such as an agitator, in a domestic appliance. FIGS. 27 and 28 illustrate such an agitator in the form of a brush bar 170.

The brush bar 170 comprises an elongated cylindrical sleeve 171 having radially extending bristles on its outer surface, as indicated at 172. The brush bar is rotatably mounted on an internal coaxial shaft 173 via bearings 174, 175. The motor is mounted centrally within the brush bar and comprises a stator 176 and a rotor 177. The rotor 177 is coaxial with the stator 176 and surrounds it such that the rotor rotates around the stator. The shaft 173 is fixed with respect to the stator 176 and the brush bar 170 is arranged to rotate with the rotor 177. The motor is an eighteen-pole, two-phase switched reluctance motor. A winding for the motor is indicated at 178 in FIG. 28. In use, a control circuit, such as that shown in FIG. 12, is used to power and drive the motor. Each winding is energised in dependence on information from an angular position sensor (not shown) associated with the rotor.

The motor causes the brushbar 170 to rotate at a typical operating speed of 3,500 rpm. The brushbar 170 may be included in the vacuum cleaner 100 of FIG. 22. The brushbar is mountable in the cleaner head 115, adjacent the suction inlet 116. Rotation of the brush bar 170 causes the bristles 172 to sweep along the surface to be cleaned, for example a carpet, agitating the fibres of the carpet to loosen dirt and dust and picking up debris. The suction of air lifts the dirt and dust from the carpet and into the dirty air inlet 116, and hence into the dust separation chamber 112 of the vacuum cleaner. The brushbar 170 may also be included in a floor tool for a vacuum cleaner.

DC Power Supply

Figure 25:
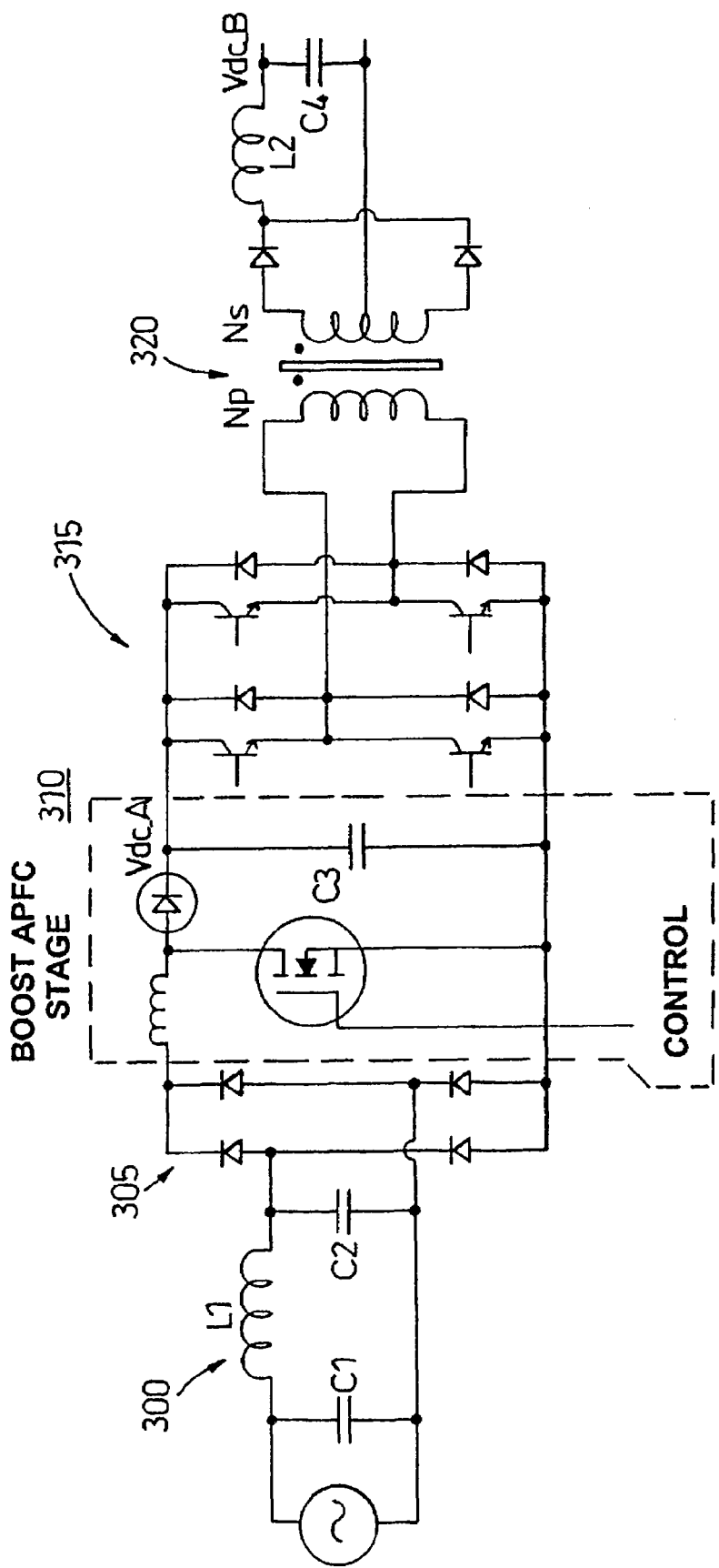
FIG. 25 shows a known type of dc power supply.

A second application of the power converter is in a dc power supply. A typical dc power supply for power ratings in excess of 1-2 kW is a full bridge dc-dc converter, as shown in FIG. 25. At the mains supply side, there is an input filter 300 (L1, C1, C2) and a bridge rectifier 305. Due to the high power rating, a boost APFC stage 310 is usually incorporated next to ensure satisfactory input current harmonics. By incorporating the boost APFC stage, Vdc_A will be maintained at a near constant dc voltage. The boost APFC stage is followed by a full bridge converter 315. With a constant dc link voltage Vdc_A, control of the full bridge converter is straightforward, depending only on the variation in load. The output of the fully controlled bridge 315 is fed to a transformer 320 and an output filter which includes an inductor L2 and an output dc capacitor C4. Vdc_B is the dc output voltage of the dc power supply. The switching frequency of the bridge converter 315 is selected to minimise the size of the output filtering components (L2, C4) whilst maintaining acceptable losses in the power electronic devices of the bridge converter 315. However, the selection of the output capacitor C4 is further complicated by standard requirements that the output voltage should be 'held up' for a defined period after the input supply has been removed, i.e. the output should remain on for a fixed time period after the input supply has been removed, such as during a power cut. This generally results in the capacitor C4 having a fairly large value, often in the range of 100 s of mF. Using a boost APFC stage 310 has the same problems as in the power converter shown previously in FIG. 1, in that it requires C3 to be large (100-150 μF) and increases the component count, size and cost of the overall power supply.

Figure 26:
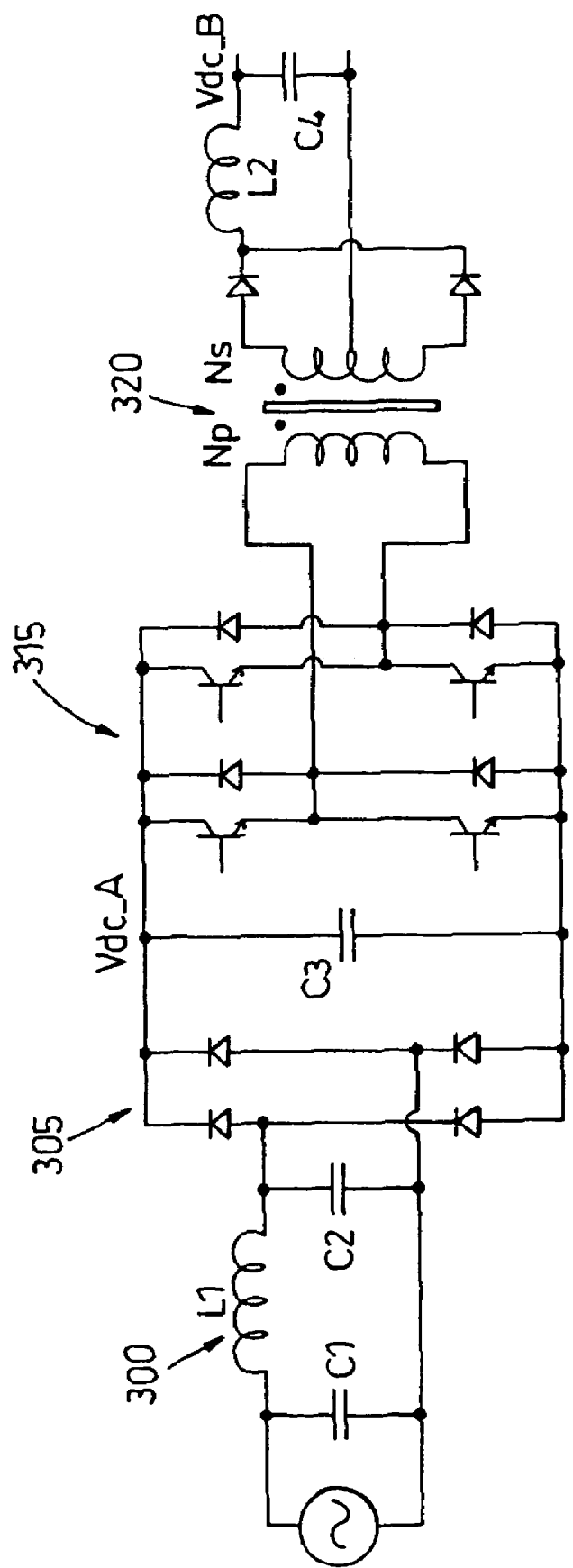
FIG. 26 shows a dc power supply in accordance with an embodiment of the present invention.

Using a technique similar to that described previously, the power supply can be modified in a way that removes the boost APFC stage 310, retaining only a capacitor C3 of significantly smaller value, as shown in FIG. 26. As a consequence of removing the boost APFC stage 310, Vdc_A now has near 100% ripple. Power transfer from the bridge converter 315, through the transformer 320 to the output stage, which is a function of the dc link voltage (Vdc_A), now varies over time. The input current to the transformer is now-taken directly from the mains supply, since the small capacitor C3 stores very little energy. As before, flux build up in the transformer must be avoided by imposing limits on the energisation period of the transformer. The size of the small capacitor C3 is heavily dependent upon the total energy transferred from the primary winding Np of the transformer and from the inductor L1 forming part of the input filter during the operation of the bridge converter 315.

Removing the boost APFC stage 310 has the apparent drawback that the switching frequency of the bridge converter no longer defines the values of the output filtering components (L2, C4). Capacitor C4 now has to be sized to cope with the varying power transfer, which is a function of the mains supply frequency. However, it has been found that the value of capacitance C4 which is required with this new scheme is similar to that which would have been required previously, as the standard requirement for the output 'hold up' period already dictates a large value of capacitor C4. The majority of the energy storage capacitance is present on the low voltage side, which has advantages in both cost and size.

It will be appreciated that the invention is not limited to the embodiment illustrated in the drawings. Specifically, the invention can be applied to multi-phase systems, for example with independent rectification for each phase.

The invention claimed is:

1. An electrical apparatus comprising:
   a motor having at least one switched phase winding and configured to drive an impeller, wherein the at least one switched phase winding is switched at a frequency greater than 2 kHz; and
   a power conversion apparatus for converting power from an alternating source to dc, the power conversion apparatus comprising;
   an input stage for receiving power from the alternating source, which input stage includes an input filter,
   a rectifier for rectifying the alternating signal,
   a capacitor for storing energy from the rectified signal, and
   an output for outputting power from the rectifier and the capacitor to the motor, wherein the at least one switched phase winding receives power from the output, and wherein the capacitor is configured such that the voltage across the capacitor has a ripple voltage which is at least 85% of the nominal peak rectified voltage of the source during each cycle of the alternating source.

2. A power conversion apparatus according to claim 1, wherein the capacitor is configured such that the voltage across the capacitor has a ripple voltage which is at least 90% of the nominal peak rectified voltage of the source during each cycle of the alternating source.

3. A power conversion apparatus according to claim 1 or 2, wherein the capacitor is configured such that the voltage across the capacitor has a ripple voltage which is at least 95% of the nominal peak rectified voltage of the source during each cycle of the alternating source.

4. A power conversion apparatus according to claim 1 or 2, wherein the capacitor is configured to store the amount of energy which is released from the winding when the winding is switched off.

5. An electrical apparatus according to claim 1, wherein the motor is a switched reluctance motor.

6. An electrical apparatus according to claim 5, further comprising a surface-treating device which is driven by the motor.

7. A vacuum cleaner comprising the electrical apparatus according to claim 1 and an airflow path formed within the vacuum cleaner, wherein the impeller is a suction fan for drawing air along the airflow path.

8. An electrical apparatus according to claim 1, further comprising a surface-treating device which is driven by the motor.

9. An electrical apparatus according to claim 8, in which the surface-treating device comprises an agitator which is rotatable by the motor.

10. A vacuum cleaner comprising the electrical apparatus according to claim 9 and an airflow path formed within the vacuum cleaner, wherein the agitator is located in a cleaner head or floor tool of the vacuum cleaner.

11. A vacuum cleaner comprising the electrical apparatus according to claim 9 and an airflow path formed within the vacuum cleaner, wherein the agitator is located in a cleaner head or floor tool of the vacuum cleaner and the motor is a switched reluctance motor.

* * * * *